United States Patent
Wynn et al.

(10) Patent No.: US 12,505,512 B2
(45) Date of Patent: Dec. 23, 2025

(54) REGULARIZING NEURAL RADIANCE FIELDS WITH DENOISING DIFFUSION MODELS

(71) Applicant: Niantic Spatial, Inc., San Francisco, CA (US)

(72) Inventors: Jamie Michael Wynn, London (GB); Daniyar Turmukhambetov, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 141 days.

(21) Appl. No.: 18/434,211

(22) Filed: Feb. 6, 2024

(65) Prior Publication Data

US 2024/0265504 A1 Aug. 8, 2024

Related U.S. Application Data

(60) Provisional application No. 63/443,709, filed on Feb. 6, 2023.

(51) Int. Cl.
*G06T 5/60* (2024.01)
*G06T 5/70* (2024.01)
(Continued)

(52) U.S. Cl.
CPC .............. *G06T 5/60* (2024.01); *G06T 5/70* (2024.01); *G06T 15/06* (2013.01); *G06T 15/08* (2013.01); *G06T 15/20* (2013.01); *A63F 13/216* (2014.09); *A63F 13/52* (2014.09); *A63F 13/655* (2014.09); *A63F 13/847* (2014.09);
(Continued)

(58) Field of Classification Search
CPC .. G06T 5/60; G06T 5/70; G06T 15/06; G06T 15/08; G06T 2207/20081; G06T 17/00; G06T 19/003
See application file for complete search history.

(56) References Cited

U.S. PATENT DOCUMENTS 12,243,273 B2 * 3/2025 Lv .......................... G06T 15/205
2024/0135483 A1 * 4/2024 Wang ..................... G06T 7/0002

FOREIGN PATENT DOCUMENTS

WO   WO-2025111101 A1 * 5/2025 ........... G06F 16/787
WO   WO-2025111544 A1 * 5/2025 ............... G06T 5/60

* cited by examiner

*Primary Examiner* — Chante E Harrison
(74) *Attorney, Agent, or Firm* — Fenwick & West LLP

(57) ABSTRACT

Methods and systems for creating accurate three-dimensional representations of environments using neural radiance fields regularized by denoising diffusion models are disclosed. Receiving a plurality of images representing an environment, a scene representation model is trained to create the three-dimensional model of the environment. Using these images, the virtual rays are sampled from training viewpoints within the environment. The scene representation model is then applied to these rays to generate simulated images of the environment from the training viewpoints. These simulated images undergo a regularization process that uses a denoising diffusion model to determine color gradients and depth gradients in each simulated image. The scene representation model is trained with this data to create the final three-dimensional model of the environment. This model is provided to the requesting client device to generate the three-dimensional representation and create a virtual object within the environment.

18 Claims, 7 Drawing Sheets

(51) Int. Cl.
G06T 15/06 (2011.01)
G06T 15/08 (2011.01)
G06T 15/20 (2011.01)
*A63F 13/216* (2014.01)
*A63F 13/52* (2014.01)
*A63F 13/655* (2014.01)
*A63F 13/847* (2014.01)

(52) U.S. Cl.
CPC ............... *G06T 2207/10024* (2013.01); *G06T 2207/20081* (2013.01); *G06T 2207/20084* (2013.01)

REGULARIZING NEURAL RADIANCE FIELDS WITH DENOISING DIFFUSION MODELS

CROSS REFERENCE TO RELATED APPLICATIONS

This application claims the benefit of U.S. Provisional Application No. 63/443,709 filed Feb. 6, 2023, which is herein incorporated in their entirety by reference.

BACKGROUND

1. Technical Field

The subject matter described relates generally to neural radiance fields (NeRFs), and, in particular, to an approach to regularizing NeRFs using denoising diffusion models.

2. Problem

Under good conditions, NeRFs have shown impressive results on novel view synthesis tasks. NeRFs learn a scene's color and density fields by minimizing the photometric discrepancy between training views and differentiable renders of the scene. Once trained from a sufficient set of views, NeRFs can generate novel views from arbitrary camera positions. However, the scene geometry and color fields are severely under-constrained, which can lead to artifacts, especially when trained with only few input views.

SUMMARY

A prior is learned over scene geometry and color using a denoising diffusion model (DDM). The DDM may be trained on RGBD patches of a synthetic dataset and can be used to predict the log gradient of a joint probability distribution of color and depth patches. During NeRF training, these log gradients of RGBD patch priors serve to regularize geometry and color for a scene. During NeRF training, random RGBD patches may be rendered and the estimated log gradients backpropagated to the color and density fields. In various embodiments, this approach may achieve improved quality in the reconstructed geometry and improved generalization to novel views.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where generating novel views of a scene is desirable. In addition, the inherent flexibility of computer-based systems allows for a great variety of possible configurations, combinations, and divisions of tasks and functionality between and among the components of the system.

Example Location-Based Parallel Reality Game

Figure 1:
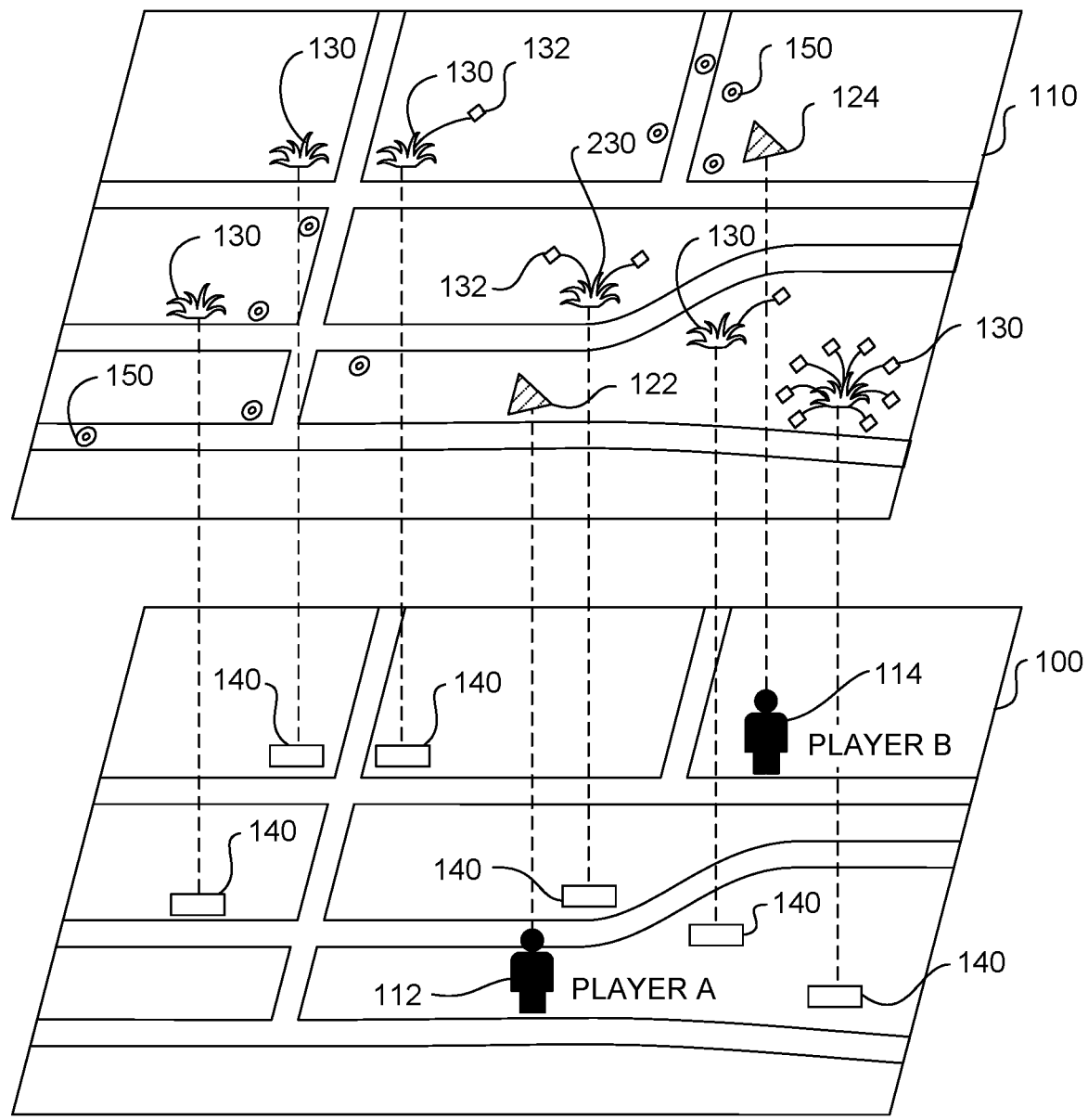
FIG. 1 depicts a representation of a virtual world having a geography that parallels the real world, according to an example embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
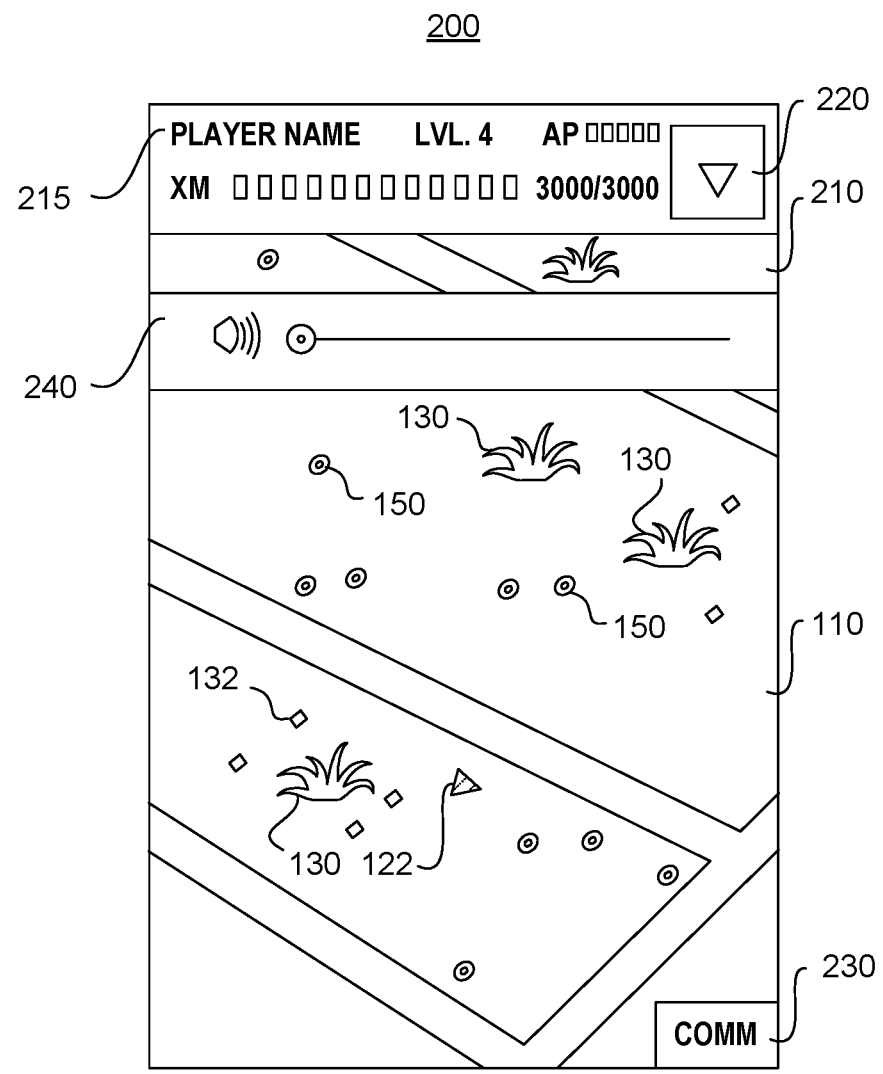
FIG. 2 depicts an exemplary game interface of a parallel reality game, according to an example embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device 110 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
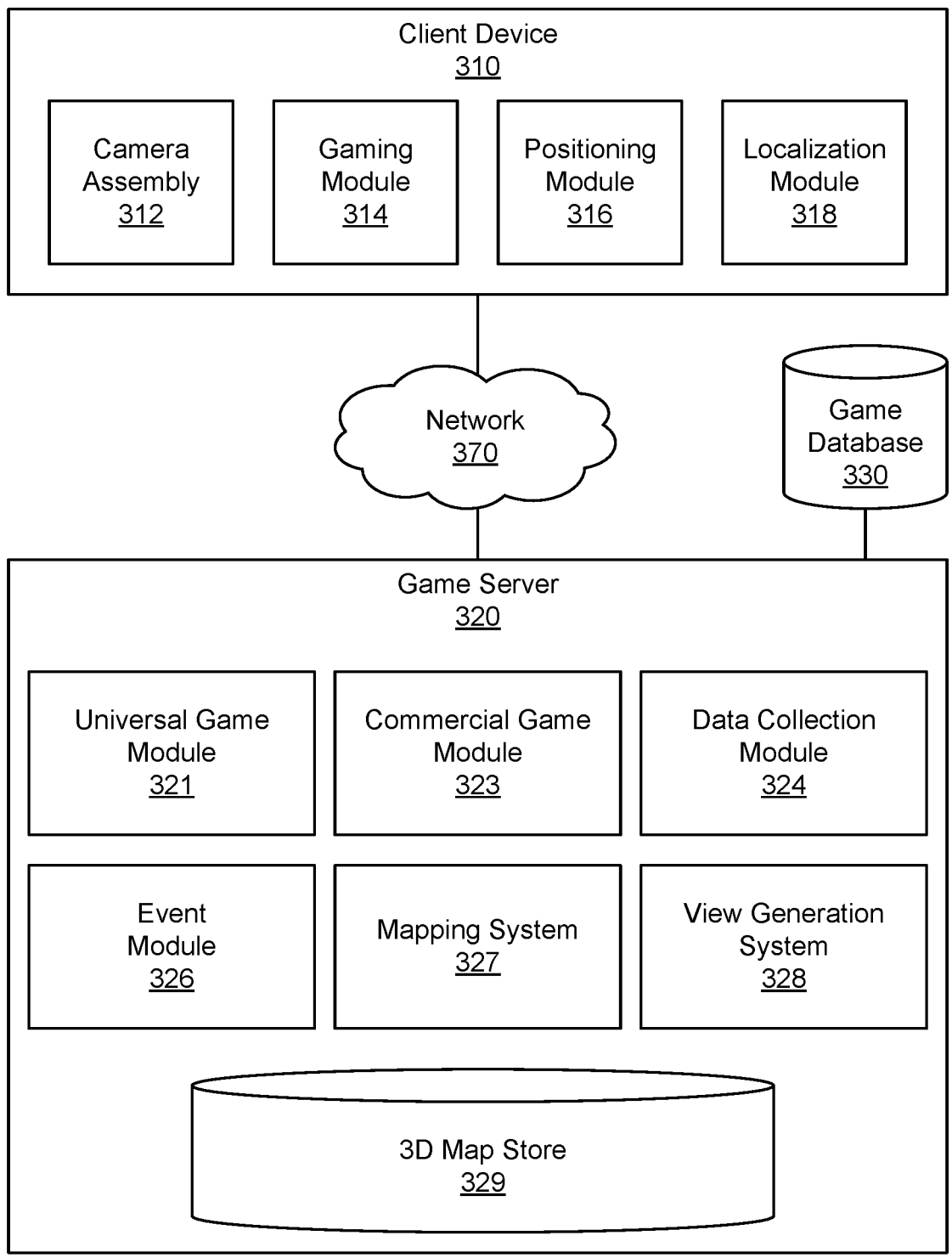
FIG. 3 is a block diagram of a networked computing environment suitable for using NeRFs to generate novel views of scenes, according to an example embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 110 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dad reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

Furthermore, in some embodiments, the client device 310 may use a model to generate novel viewpoints of a scene and display them to a user. When interacting with AR content overlaid on the scene in front of the user, the user may be able to change the viewpoint of the scene without physically moving the client device 310. For example, the user may be able to "peek" around a corner by flying virtual drone to the corner or move the viewpoint around a virtual object to view the other side of it without physically moving the client device 310, etc.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game datastored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game datastored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, a view generation system 328, and a 3D map 329. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game datastored in the game database 330 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 329. The 3D map may be stored in the 3D map store 329 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The view generation system 328 generates novel views of scenes without a camera capturing the novel views. In one embodiment, the view generation system 328 uses a NeRF to generate a novel view of a scene. The scene may be the current environment of a client device 310 (thus enabling the client device to present alternate, novel views of the environment around it without being moved) or a pre-loaded scene (thus enabling a user to explore a remote scene using a client device without the client device needing a complete 3D map of the scene). Various embodiments of the view generation system 328 and approaches to using NeRFs to generate novel views of scenes are described in greater detail below. Note that the sections below describe specific embodiments by way of example only and any features described as essential, critical, or otherwise important are important only for those embodiments. Other embodiments may omit some or all of those features.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example View Generation System

The view generation system 328 generates views of a scene. To do so, the view generation system 328 generates and trains a scene representation model capable of generating those views. The scene representation model receives a request (e.g., from a user) to generate a view from a viewpoint within a scene, and generates a view from that viewpoint. In various embodiments, the view generation system 328 may generate the scene representation model and generate the views to provide to requesting client devices 310 using the generated model, or the view generation system 328 may generate the scene representation model and provide the scene representation model to requesting client devices 310 such that the requesting client devices 310 can generate views locally.

To generate the scene representation model, the view generation system 328 includes a representation module 410, a training module 420, and a training image database 430. The training module 420 includes loss functions 422 and a diffusion model 424. The view generation system 328 may include additional or fewer modules. Moreover, the modules may have different functionality than what is described herein, and/or the functionality of various modules may be distributed differently among the modules.

At a high level, the representation module 410 generates the scene representation model using a model configured to generate digital, volumetric representations of a scene based on a set of input images of the scene. The scene representation model can generate views (e.g., images) from various viewpoints in the scene. The training module 420 trains the representation module 410 to generate an improved scene representation model using various training techniques described below. Both the representation module 410 and the training module 420 may access training images from the training image datastore 430.

Figure 5:
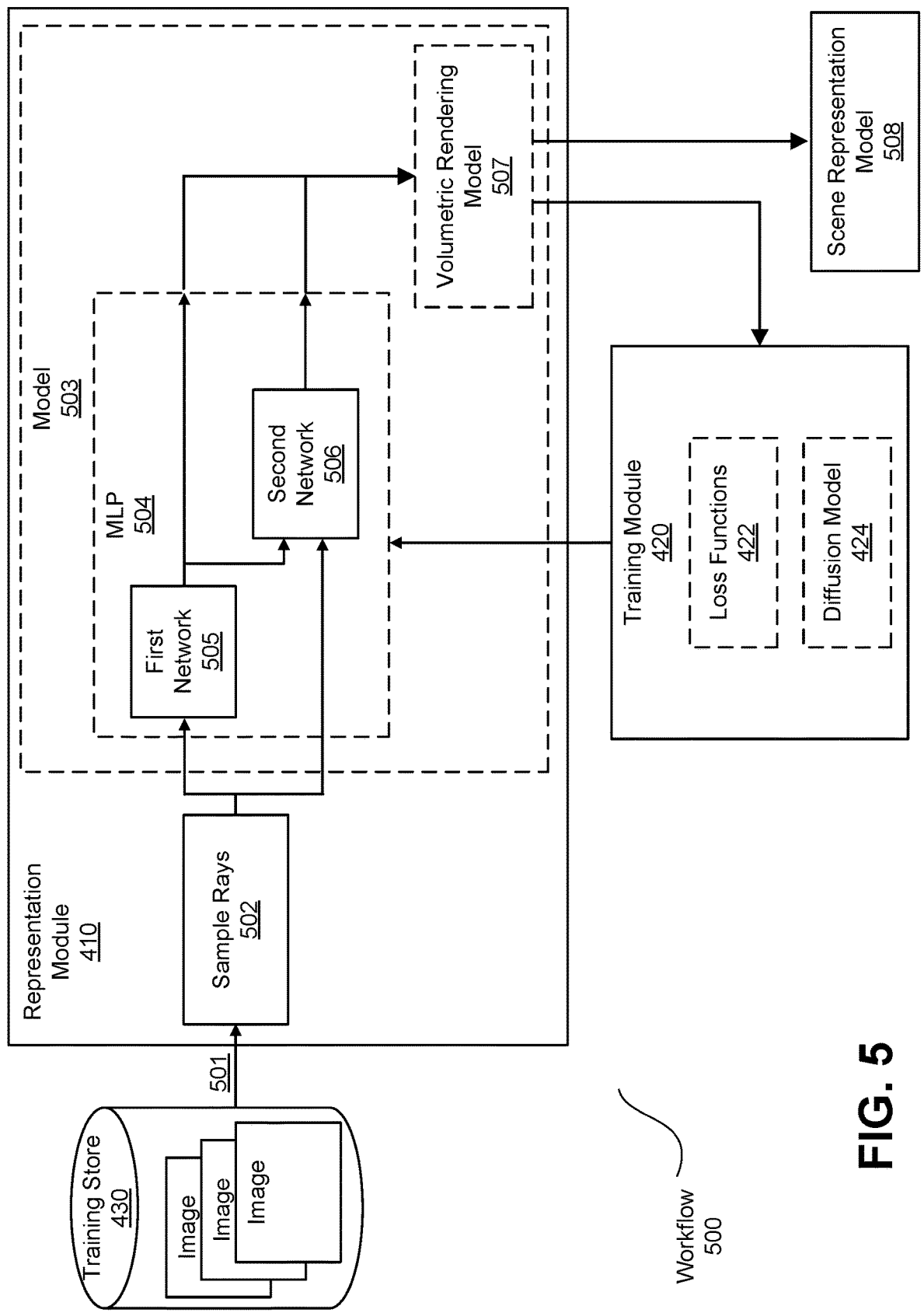
FIG. 5 illustrates a diagram showing the workflow of the view generation system to generate a scene representation model, according to an example embodiment.

To provide greater context, FIG. 5 illustrates a diagram showing the workflow of the view generation system to generate a scene representation model, according to an example embodiment. The illustrated workflow 500 may have additional or fewer steps and/or one or more of the steps may occur in a different order. Moreover, one or more of the illustrated steps may be repeated and/or omitted depending on the configuration of the view generation system 328.

The representation module 410 accesses 501 training images from the training image datastore 430. The training images may be the images received from a client device 310, which may be included in a request to generate a scene representation model. In some cases, the training images may be accessed from the training image datastore 430. Each of the images includes an array of pixels, and each of the images may have an associated camera position including camera rotation and camera translation (with respect to the scene). The pixels in each image include latent information that represents volumetric information about the scene they capture. The volumetric information includes position information p (e.g., x, y, z information) and depth information d (e.g., distance from the image capture system).

Typically, the latent information representing volumetric information in the scene is encoded in the pixel values and pixel positions in the image. So, for instance, pixels representing a chair in the scene may be a set of pixels approximating the shape of a chair and having the color of an office chair. The images and pixels, in aggregate, represent several viewpoints of the scene, and, as such, may include information about objects in the scene from different viewpoints. Thus, in the aggregate, the volumetric information may be used to construct a scene representation model configured to generate representations of different viewpoints in that scene (using the various training images as its basis).

The representation module 410 samples 502 training rays based on the accessed images. Training rays are virtual light rays generated by the representation module 410 that propagate through the scene. Depending on the configuration, the training rays may represent light from one or more of a single point in space, an area in space, or a volume in space. For instance, a training ray may be a ray propagating through the scene from a localized viewpoint in space, or a set of training rays may be those rays propagating through the scene from a corresponding set of viewpoints in space. Sampling the training rays may also include generating views (e.g., images) using those training rays.

To illustrate, consider a set of training rays (a "ray patch") generated from the accessed images and propagating from a set of viewpoints (a "view patch"). The view patch, therefore, represents a view of the scene from the aggregated viewpoints associated with the ray patch. Because the accessed images include latent information representing volumetric information in the scene, each of the rays in the ray patch corresponds to at least some of that volumetric information. Therefore, the representation module 410 may assign some of that volumetric information to points on rays of the ray patch. As such, the volumetric information assigned to the ray patch can be used to generate three-dimensional representations of the scene and train a scene representation model.

The representation module 410 applies model 503 to the training rays to generate the scene representation model. In an example, the model 503 is a neural radiance field ("NeRF") but there could be other models configured to generate a scene representation model. In the configuration where the model is a NeRF, the representation module 410 applies a multi-layer perceptron ("MLP") 504 to training rays and/or points on the training rays to determine density information and color information and then applies a volumetric rendering model 507 to that information to determine an estimated color and an estimated depth of the pixel corresponding to the training ray. The representation module 410 uses the estimated color and the estimated depth to train the scene representation model.

To illustrate, in an example, the MLP 504 may include a first neural network 505 and a second neural network 506. The representation module 410 inputs some portion of the volumetric information of the training rays into the first network 505 and outputs density information. For instance, the representation module 410 may input position information p at points along training rays into the first network 505, and output density information corresponding to those points along the training rays. Additionally, the representation module 410 may input the density information and some portion of the volumetric information of the training rays into the second network 506 and output color information. For instance, the representation module 410 input density information as determined by the first network 505 and depth information d at points along the training rays into the second network 506, and outputs color information at those points.

The representation module 410 inputs the density information and color information determined into the volumetric rendering model 507, and the volumetric rendering model 507 outputs an estimated color and an estimated depth. The estimated color is a function that gives the expected color of a ray at a particular position in the scene (when viewed from a viewpoint), and the estimated depth is a function that gives the expected depth at a particular position in the scene (when viewed from a viewpoint). The volumetric rendering model 507 may also output weights of color contributions ("color contributions") and positions of samples within the scene ("sample positions"). Therefore, the output of the volumetric rendering model 507, in aggregate, is a virtual representation of the scene that can be used to generate a model approximating views of the scene—e.g., the scene representation model 508.

Additionally, the representation module 410 may be configured to generate a rendered patch. The rendered patch is, e.g., a pair of images representing a simulated view from the view patch. The pair of images may include both color and depth information. More explicitly, one of the images is an RGB representation of the view patch (the "RGB image") and the other image is a representation of depth information corresponding to the view patch (the "depth image"). The RGB image and the depth image are generated using the color information and depth information generated by the MLP. In other words, to generate a rendered patch, the representation module 410 inputs a ray patch generated from a view patch in the scene. The MLP 504 and/or volumetric rendering model 507 generate the rendered patch based on the ray patch of the view patch much like they would a view from a viewpoint (e.g., simulating color and depth). Characteristics of the rendered patch may be used to train the MLP 504 to more accurately generate color and density information based on training rays.

The representation module 410 inputs the color information, depth information, color contributions, and sample position of the scene and outputs the scene representation model 508. The scene representation model 508 can generate a view from any viewpoint in the scene. The scene representation model 508 may be a trained version of the model 503. In other words, the representation module 410 and training module 420 may continue to refine the model 503 until the loss function is minimized (or the loss is below a threshold), and the representation module 410 outputs the trained model 503 which generates the minimized loss function as the scene representation model 508.

The view generation system 328 employs the training module 420 to train the model 503 to generate color and density information more accurately from training rays such that the representation module 410 may generate a more accurate scene representation model 508. The training module 420 can train the model 503 using several methodologies including, e.g., various loss functions 422 and a diffusion model 424. Generally, the training module 420 can use any of the color information, the depth information, color contributions, sample positions, and rendered patches to generate backpropagation information for training the model 503. Additionally, depending on the configuration, the training module 420 may use position information, estimated color, estimated depth, depth information, color information, and density information to generate backpropagation information for training the model 503. Still further, in some configurations, the training module 420 may use volumetric renderings and/or the scene representation model 508 to train the model 503.

Many possible loss and regularization functions (e.g., "loss functions 422," shown as loss functions 422) may be employed to train the model 503. In a first example, the training module 420 calculates a difference between input images at a viewpoint and renderings of an image from that same viewpoint. In a second example, the training module 420 applies a regularizer function to the color contributions such that they have a compact distribution. In a third example, the training module 420 applies a regularizer function such that the color contributions sum to unity. In a third example, the training module 420 applies a regularizer function in which the placement of density that is contained in only one view frustum is penalized based on the number of training frustums so that only color contributions that lie in fewer than two training frustums are included in the sum. The training module 420 may weigh the various error functions differently (or the same) to create an overall loss function that, when executed, can output loss information and derived backpropagation information used to train the model 503.

The training module 420 may apply a diffusion model 424 to train the model 503. In an example configuration, the diffusion model 424 may be a denoising diffusion model, but could be some other diffusion model 424. To generate the training information, the training module 420 inputs the rendered patch into the diffusion model 424. The diffusion model 424, broadly speaking, determines how much "noise" is in the rendered patch. Noise in the rendered patch generally stems from a poorly trained model 503 whose MLP 504 and volumetric rendering model 507 introduce noise to the rendered patches. For instance, the first network 505 and the second network 506 may be poorly trained such that they generate density and color information which includes errors.

To continue, to generate information to train the model 503, the diffusion model 424 quantifies an amount of "negative gradient information" in the rendered patch that would lead towards a non-noisy mode of the view in the rendered patch. So, for example, the training module 420 may identify an amount of gradient that would lead to a noisy RGB image and/or depth image in a rendered patch to a less noisy RGB image and/or depth image for the rendered patch. In other words, the diffusion model 424 serves as a regularizer for the rendered patches, where regularization involves quantifying a gradient between the rendered patch and the color and/or density information that generated the rendered patch. The regularization process using the rendered patches may be used to train the MLP 504 to generate more accurate color and density information. Like the loss functions 422, the training module 420 may weight the output of the diffusion model 424, and the weighted output may be used in the backpropagation information for training the model 503. Training the diffusion model 424 is described in more detail below.

Example Diffusion Model

As described above, the training module 420 includes a diffusion model 424 configured to generate backpropagation information that trains the model 503 to generate more accurate color information and density information.

As described above, in an example configuration, the diffusion model 424 is a denoising diffusion model 424 that determines a difference (e.g., gradient) between a rendered patch and the color and density information used to generate that rendered patch and trains the model based on that difference. Notably, important to this process is training the diffusion model 424 to appropriately identify and quantify noise in a rendered patch such that the rendered patches can be used as a regularlizer for the model 503.

To train the diffusion model 424, the view generation system 328 accesses a set of training images from the training image datastore 430. The training images may be a set of real or virtual images of a scene configured for training models (e.g., including rich volumetric information), or could be some other set of training images.

The view generation system 328 selects a viewpoint in the scene represented by the images and generates an color image of the scene from that viewpoint (e.g., using a model 503 or using a 3D graphics rendering engine). The generated color image and depth image, in effect, correspond to the estimated color generated by the volumetric rendering model 507. The view generation system 328 applies a forward diffusion process to the generated color and depth image, gradually increasing Gaussian noise in the image until the color and depth image is wholly noisy. Because the color and depth image corresponds to the estimated color generated by the volumetric rendering model 507, the various amount of noise introduced to the color image and depth image corresponds to, e.g., "noise" (or error) in the color and depth image generated by the MLP 504.

The view generation system 328 applies a reverse diffusion process to the noisy color and depth image. In the reverse diffusion process, the view generation system 328 gradually removes noise from the noisy color image and depth image. Because the color image and depth image corresponds to the estimated color and estimated depth generated by the volumetric rendering model 507, the various amount of noise removed from the noisy color image and depth image corresponds to, e.g., "noise" (or error) being removed from the estimated color and estimated depth generated by the volumetric rendering model 507.

Thus, the view generation system 328 can generate a function that quantifies how much error is in the estimated color and estimated depth generated by the volumetric rendering model 507. by "comparing" it to the noisy color images and noisy depth images from the forward and reverse diffusion processes (the comparison may be performed by, e.g., a machine learning model such as a neural network). Quantifying can also include determining a gradient that would decrease the noise in both the estimated color and estimated depth generated by the volumetric rendering model 507, which the training module 420 may use to train the model 503.

To illustrate this process, relating to the description of the Example View Generation System, consider a rendered patch generated using a ray patch from a view patch. The RGB image and the depth image in the rendered patch correspond to the color image and depth image described in the diffusion model 424 training process. Thus, if there is noise in either of the images of the rendered patch, the diffusion model 424 can quantify that amount of noise (because they correspond to noisy color and depth images) and generate backpropagation information that will train the model 503 to generate estimated color and estimated depth with less noise.

Using a more explicit formalism, noise-reducing gradient generated by the diffusion model 424 are used as a prior over the color information and density information generated by the MLP 504. The color information and density information are represented by the estimated color and depth image of the rendered patch. Thus, the diffusion model 424 implements a score function quantifying loss over one or more rendered patches in a scene relative to the generated RGB view and depth view priors.

In some embodiments, the diffusion model operates directly on color information and density information (rather than estimated color and estimated depth in rendered patches) generated by the MLP 504. In this case, the training module 420 computes gradients of color information and density information (rather than gradients of estimated color and estimated depth).

Example Generation of a Scene Representation Model

Figure 6:
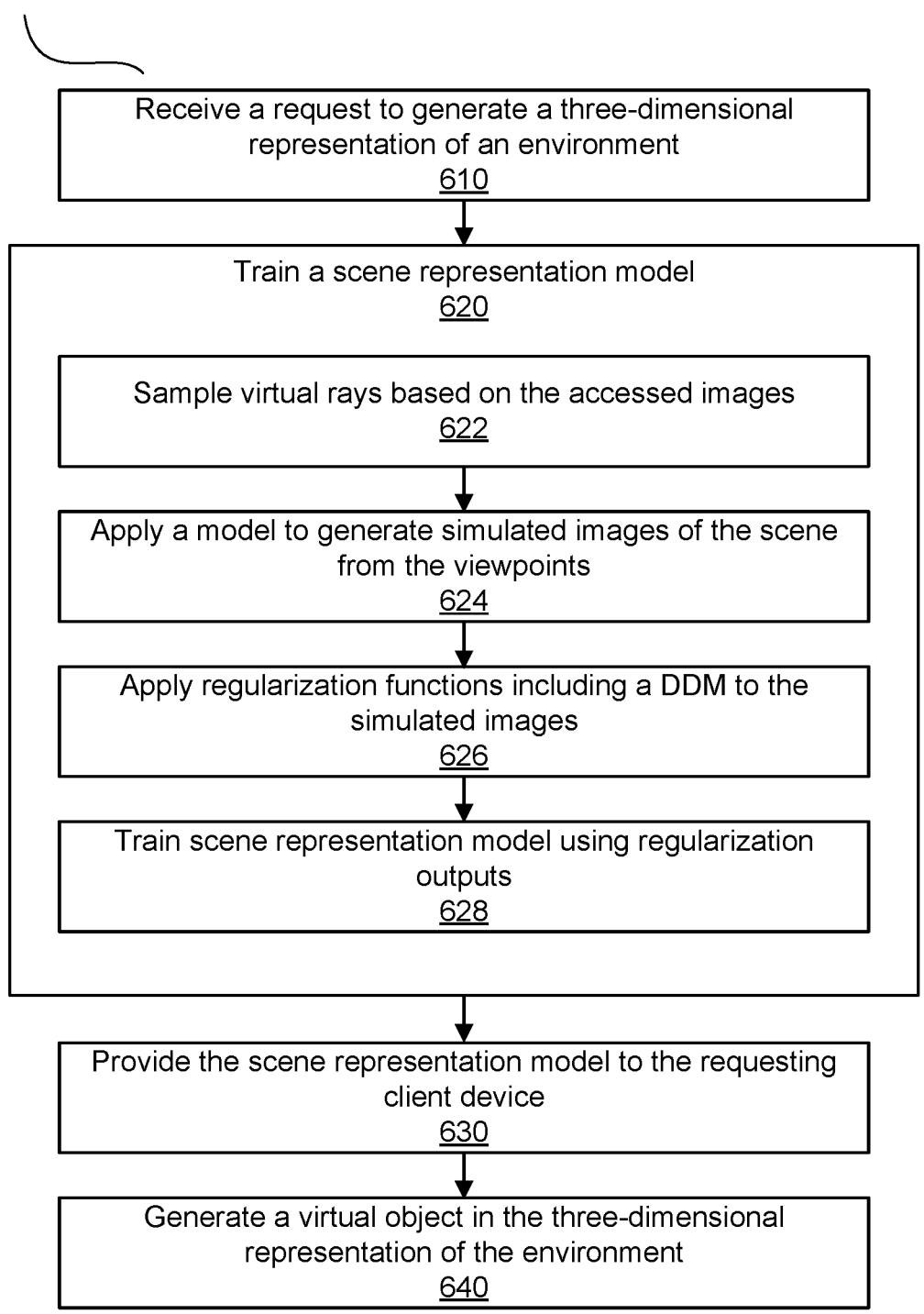
FIG. 6 illustrates a workflow diagram of generating a scene representation model, according to an example embodiment.

As described above, the representation module 410 generates a scene representation model 508. The scene representation model can input one or more viewpoints in a scene, and output corresponding views (e.g., images) from those viewpoints. FIG. 6 illustrates a workflow diagram of generating a scene representation model, according to an example embodiment. The illustrated workflow 600 may have additional or fewer steps and/or one or more of the steps may occur in a different order. Moreover, one or more of the illustrated steps may be repeated and/or omitted depending on the configuration of the view generation system 328.

A user is operating a client device 310 to play a parallel reality game. To do so, the client device accesses a game server 320 over a network 370, and the game server 320 provides various information to the client device 310 to enable the user to play the parallel reality game.

Within this environment, the game server 320 receives 610, from the client device 310, a request to generate a three-dimensional representation of their environment (e.g., a scene). The request includes one or more images of the scene, which, in the aggregate, include latent information enabling the game server 320 to generate three-dimensional representations of the environment. In some examples, the images have corresponding camera position information associated with each image.

The game server 320 trains 620 a scene representation model 508 to generate the requested three-dimensional representation of the environment using the received images.

To do so, the game server 320 samples 622 virtual rays from training viewpoints in the environment. The virtual rays and training views may be extrapolated from the received images.

The game server 320 applies 624 a model to the virtual rays to generate simulated images of the environment corresponding to the training viewpoints. In a configuration, the model may be a neural radiance field, but could be other models. The simulated images may include one or more rendered patches simulating the training viewpoints. The simulated images may also include one or more simulated RGB images mirroring the viewpoint of the accessed images.

The game server 320 applies 626 one or more regularization functions to the simulated images to determine a color gradient and a density gradient for each simulated image. In an embodiment, the regularization function may be a denoising diffusion model 424 configured to analyze noise levels in the rendered patches to determine backpropagation information, that, when used to train the scene representation model 508, reduces noise in simulated images.

The game server 320 trains the scene representation model 508 to generate the three-dimensional model of the environment. The game server 320 may train the scene representation model 508 with the backpropagation information determined from the color gradient and/or depth gradient. The game server 320 may also train the scene representation model 508 using any of the loss functions 422 described above.

In an embodiment, the game server 320 provides 630 the trained scene representation model 508 to the client device 310, and the client device 310 executes the scene representation model 508 to generate the three-dimensional representation of the scene. In an embodiment, the game server 320 executes the trained scene representation model 508 and provides the requested three-dimensional representation of the environment to the client device 310. In some embodiments, the client device 310 requesting the three-dimensional representation of the scene, and the client device 310 which the game server provides 630 the scene representation model may be different client devices and/or players. In this manner, the game server 320 can generate a single scene representation model for a scene, rather than having to repeatedly do so for each request for the scene.

Generally, the client device 310 executes 640 the trained scene representation model 508 to enable the gameplay of the parallel reality game. For instance, the client device 310 may execute the scene representation model 508 to generate a virtual object to display in a three-dimensional representation of the environment generated by the scene representation model 508.

Example Computing System

Figure 7:
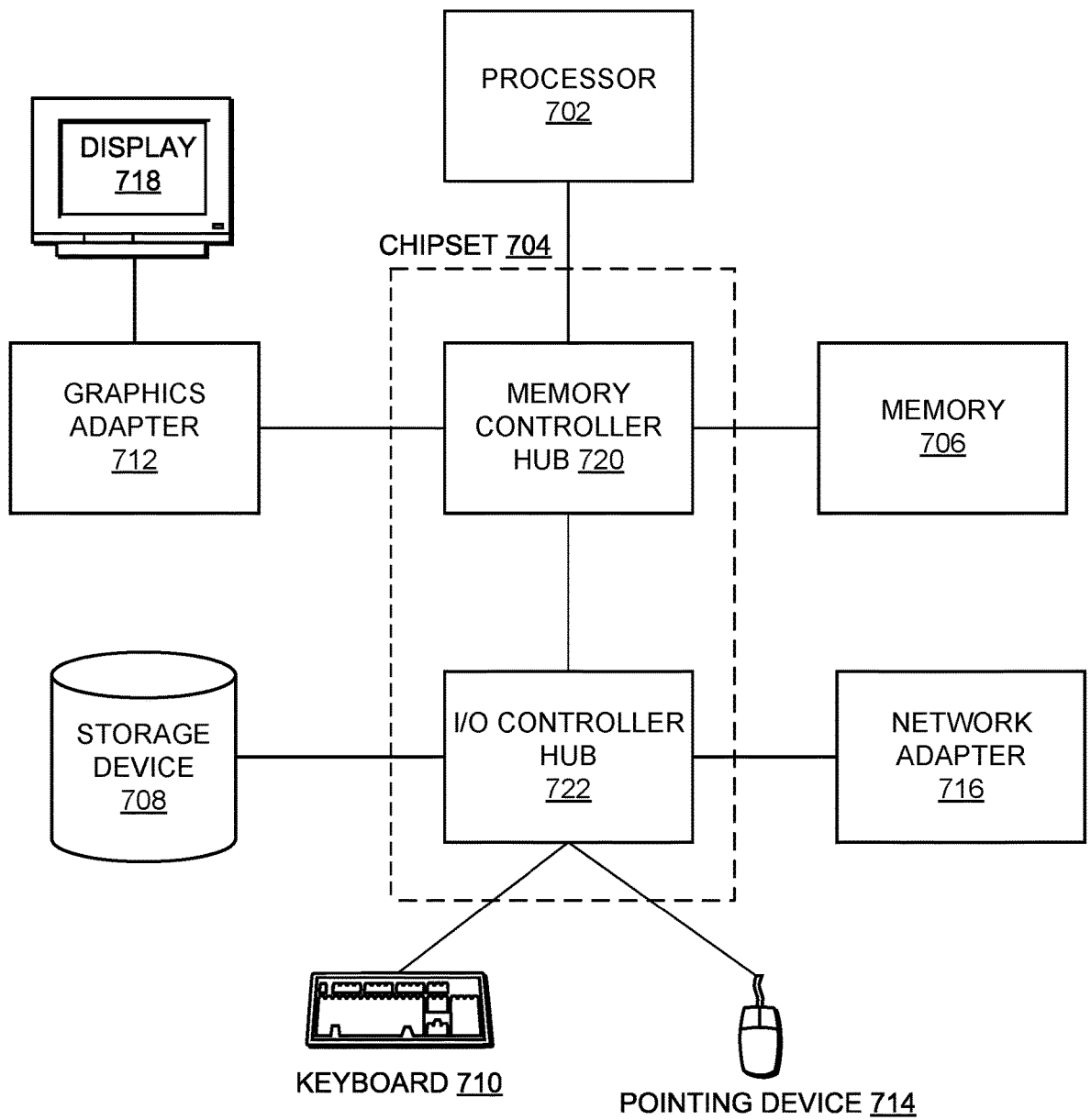
FIG. 7 is a block diagram of an example computer suitable for use as a client device or game server, according to an example embodiment.

FIG. 7 is a block diagram of an example computer 700 suitable for use as a client device 310 or game server 320. The example computer 700 includes at least one processor 702 coupled to a chipset 704. The chipset 704 includes a memory controller hub 620 and an input/output (I/O) controller hub 622. A memory 706 and a graphics adapter 712 are coupled to the memory controller hub 620, and a display 718 is coupled to the graphics adapter 712. A storage device 708, keyboard 710, pointing device 714, and network adapter 716 are coupled to the I/O controller hub 622. Other embodiments of the computer 700 have different architectures.

Figure 4:
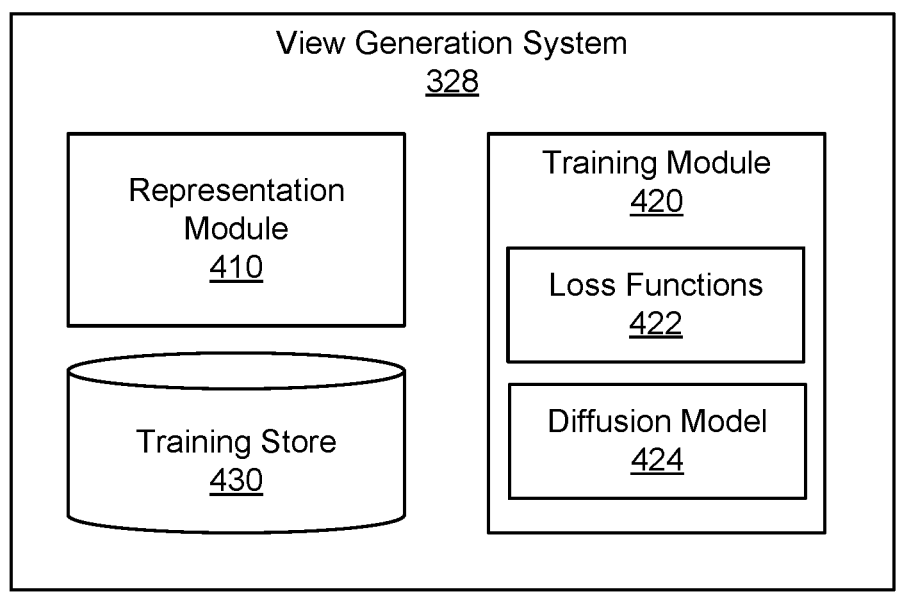
FIG. 4 illustrates an example computer system suitable for use in the networked computing environment of FIG. 1, according to an example embodiment.

In the embodiment shown in FIG. 4, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and may be used in combination with the keyboard 710 (which may be an on-screen keyboard) to input data into the computer system 700. The graphics adapter 712 displays images and other information on the display 718. The network adapter 716 couples the computer system 700 to one or more computer networks, such as network 370.

The types of computers used by the entities of FIG. 3 can vary depending upon the embodiment and the processing power required by the entity. For example, the game server 320 might include multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by any claims that ultimately issue.

What is claimed is:

1. A method comprising:
    receiving, from a client device, a request to generate a three-dimensional representation of an environment, the request comprising a plurality of images representing the environment;
    training a scene representation model to generate the three-dimensional representation of the environment using the plurality of images, the training comprising:
        sampling, using the plurality of images, virtual rays from training viewpoints in the environment;
        applying the scene representation model to the virtual rays to generate simulated images of the environment corresponding to the training viewpoints;

applying, to the simulated images, a regularization function to determine a color gradient and a depth gradient for each simulated image, wherein the regularization function is a denoising diffusion model;

wherein the denoising diffusion model is trained using a forward diffusion process on color information generated by the scene representation model, and using a reverse diffusion process on density information generated by the scene representation model; and training, using the color gradients and the depth gradients determined by the regularization model, the scene representation model to generate the three-dimensional representation of the environment; and providing, to the client device as a response to the request, the trained scene representation model;

wherein the client device executes the scene representation model to generate the three-dimensional representation of the environment and generates a virtual object to display in the generated three-dimensional representation of the environment.

2. The method of claim 1, wherein the scene representation model is a neural radiance field.

3. The method of claim 1, wherein applying the scene representation model performs volumetric rendering of the environment to generate an estimated color and an estimated depth of the environment.

4. The method of claim 1, wherein the scene representation model comprises a first neural network configured to generate color information and a second neural network to generate density information based on the sampled virtual rays.

5. The method of claim 1, wherein applying the scene representation model to the virtual rays to generate simulated images of the environment corresponding to the training viewpoints generates an estimated color and an estimated depth at each point of the environment.

6. The method of claim 1, wherein applying the scene representation model to the virtual rays to generate simulated images of the environment corresponding to the training viewpoints generates color weighs and sample positions in the environment.

7. The method of claim 1, wherein applying the regularization function to determine the color gradient and the depth gradient for each simulated image calculates a loss gradient for the simulated image based on an estimated color and an estimated depth, and wherein training the scene representation model is based on the estimated color and the estimated depth.

8. The method of claim 1, wherein the denoising diffusion model is trained using a forward diffusion process on color information generated by a 3D graphics rendering engine, and using a reverse diffusion process on density information generated by the scene representation model.

9. The method of claim 1, wherein the simulated images are RGBD images comprising an RGB image and a depth image corresponding to the RGB image.

10. A method comprising:

capturing, using a client device, a plurality of images representing an environment;

transmitting, to a network system, a request to generate a three-dimensional representation of the environment, the request comprising the plurality of images representing the environment;

receiving, from the network system, a scene representation model, wherein the trained scene representation model is trained by:

sampling, using the plurality of images, virtual rays from training viewpoints in the environment;

applying the scene representation model to the virtual rays to generate simulated images of the environment corresponding to the training viewpoints;

applying, to the simulated images, a regularization function to determine a color gradient and a depth gradient for each simulated image, wherein the regularization function is a denoising diffusion model;

wherein the denoising diffusion model is trained using a forward diffusion process on color information generated by the scene representation model, and using a reverse diffusion process on density information generated by the scene representation model; and training, using the color gradients and the depth gradients determined by the regularization model, the scene representation model to generate the three-dimensional representation of the environment; and executing, using the client device, scene representation model to generate the three-dimensional representation of the environment and generates a virtual object to display in the generated three-dimensional representation of the environment.

11. The method of claim 1, wherein the scene representation model is a neural radiance field.

12. The method of claim 1, wherein applying the scene representation model performs volumetric rendering of the environment to generate an estimated color and an estimated depth of the environment.

13. The method of claim 1, wherein the scene representation model comprises a first neural network configured to generate color information and a second neural network to generate density information based on the sampled virtual rays.

14. The method of claim 1, wherein applying the scene representation model to the virtual rays to generate simulated images of the environment corresponding to the training viewpoints generates an estimated color and an estimated depth at each point of the environment.

15. The method of claim 1, wherein applying the scene representation model to the virtual rays to generate simulated images of the environment corresponding to the training viewpoints generates color weights and sample positions in the environment.

16. The method of claim 1, wherein applying the regularization function to determine the color gradient and the depth gradient for each simulated image calculates a loss gradient for the simulated image based on an estimated color and an estimated depth, and wherein training the scene representation model is based on the estimated color and the estimated depth.

17. The method of claim 1, wherein the denoising diffusion model is trained using a forward diffusion process on color information generated by a 3D graphics rendering engine, and using a reverse diffusion process on density information generated by the scene representation model.

18. A non-transitory computer-readable storage medium comprising computer program instructions, the computer program instructions, when executed by one or more processors, causing the one or more processors to:

receive, from a client device, a request to generate a three-dimensional representation of an environment, the request comprising a plurality of images representing the environment;

train a scene representation model to generate the three-dimensional representation of the environment using the plurality of images, the training comprising:
  sampling, using the plurality of images, virtual rays from training viewpoints in the environment;
  applying the scene representation model to the virtual rays to generate simulated images of the environment corresponding to the training viewpoints;
  applying, to the simulated images, a regularization function to determine a color gradient and a depth gradient for each simulated image, wherein the regularization function is a denoising diffusion model;
  wherein the denoising diffusion model is trained using a forward diffusion process on color information generated by the scene representation model, and using a reverse diffusion process on density information generated by the scene representation model; and
  training, using the color gradients and the depth gradients determined by the regularization model, the scene representation model to generate the three-dimensional representation of the environment; and
provide, to the client device as a response to the request, the trained scene representation model;
wherein the client device executes the scene representation model to generate the three-dimensional representation of the environment and generates a virtual object to display in the generated three-dimensional representation of the environment.

* * * * *